June 12, 1928.
E. R. BURTNETT
1,673,182
INTERNAL COMBUSTION ENGINE
Filed Nov. 5, 1925　　2 Sheets-Sheet 2
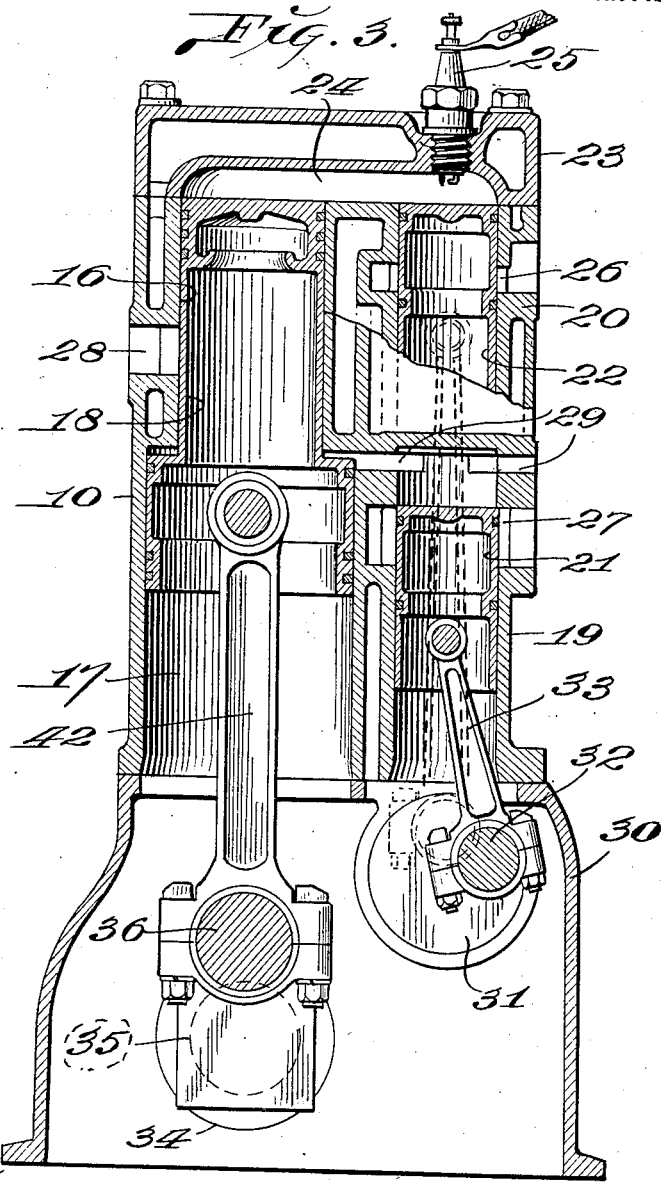
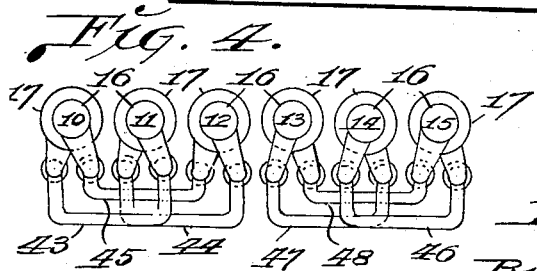
INVENTOR,
E. R. Burtnett,
By Martin P. Smith
Atty.

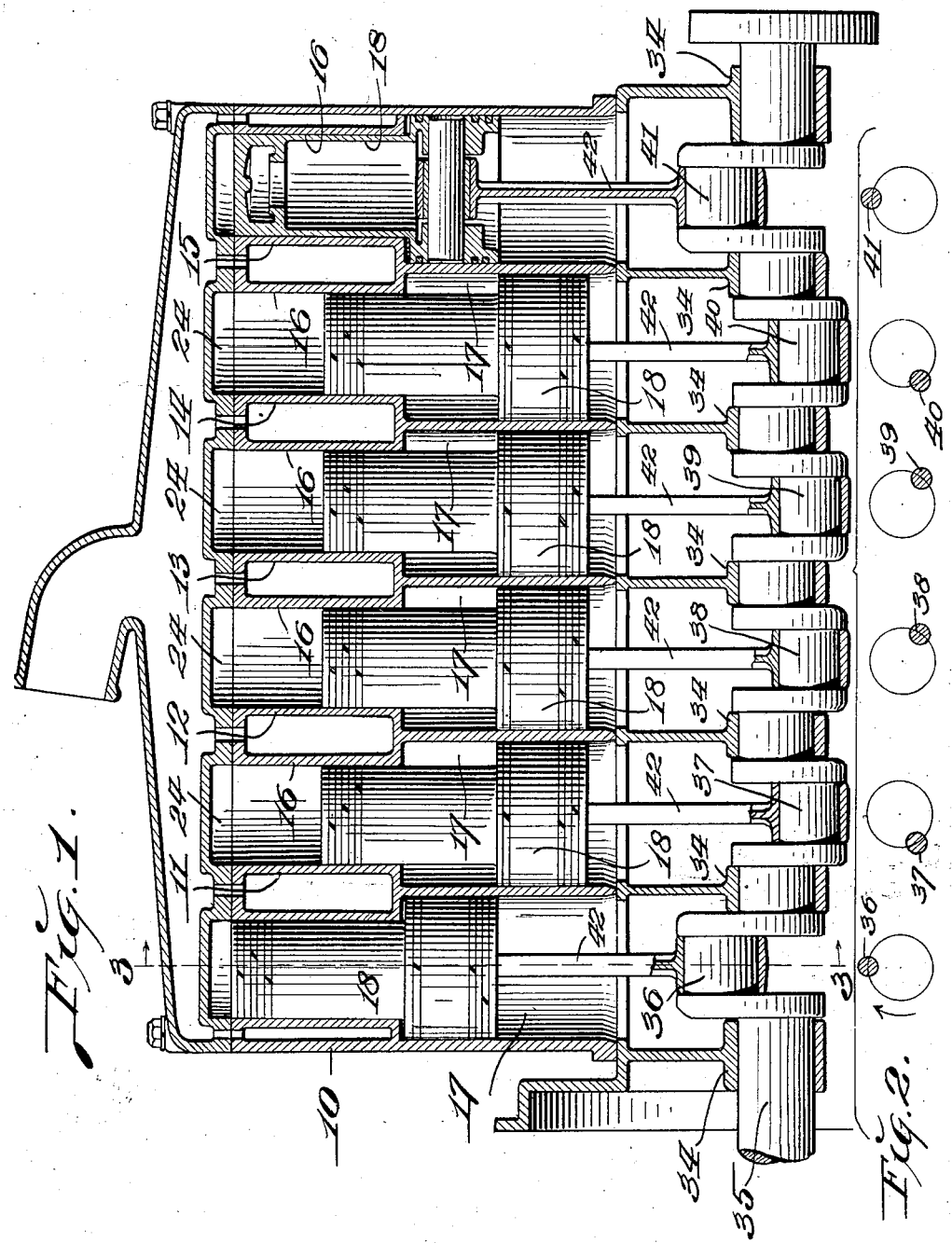

Patented June 12, 1928.

1,673,182

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed November 5, 1925. Serial No. 66,965.

My invention relates to a two stroke cycle internal combustion engine and has for its principal object the provision of a relatively simple, practical and efficient six cylinder engine that will develop three power impulses to each revolution of the crank shaft, thus obtaining the same desirable development of power that is produced by the conventional six cylinder engine that operate on the four stroke cycle principle.

It is a further object of my invention to provide an engine of the character referred to that will, in operation, produce power impulses simultaneously at points on the crank shaft equidistant from a central point, thus producing an equal distribution of the strains of said power impulses and eliminating torsional vibration.

By arranging the six cylinder units of the engine in pairs with the first units at the ends of the row constituting one pair, the second units from each end constituting the second pair and the third units from each end constituting the third pair, I am able to eliminate the rocking couple caused by any variation in inertia force from end to end that would otherwise develop a vertical end to end alternating jumping action and likewise eliminating rocking couple horizontally as a result of any variation in rotary centrifugal force from end to end lengthwise of the engine and its crank shaft.

In accomplishing the foregoing objects I provide a six cylinder engine with a six crank pin crank shaft, the first and sixth crank pins having the same longitudinal axis, the second and fifth crank pins having the same longitudinal axis and the third and fourth crank pins having the same longitudinal axis, and the six cylinders of the engine being arranged in a row with their axes parallel and disposed so that they intersect the axis of the crank shaft.

In the operation of a two stroke cycle internal combustion engine a force must be developed to cause the fresh charge volume to enter the combustion chamber and displace the residual gases therein, therefore a pump must be provided that operates with the same pumping frequency as the combustion function, which latter is of the two stroke cycle principle. The pumping means must be timed so as to cause the fresh charge to be transferred from a given pump chamber into a given combustion chamber, the piston within which latter is, during the induction period, positioned so as to permit the expulsion of the residual gases by the induction of the fresh charge.

To accommodate this pumping function I utilize six two diameter cylinders each having a two diameter piston. The chamber of the smaller diameter functions as a combustion chamber and the larger chamber in each cylinder functions as a pumping chamber. Thus I am able to provide in a six cylinder engine two pumps that are cylinders alike in function, position and action, and likewise two combustion chambers that are alike in function, position and action.

For the admission of the charge volumes to each pump I provide suitable valvular means, preferably a piston valve, and the latter being separately connected to the crank pin of an auxiliary crank shaft and similar valvular means is employed for controlling the admission of the pumped fuel charge from each pump to a corresponding one of the combustion cylinders.

With the foregoing and other objects in view, my invention consists in certain novel features of construction and arrangement of parts that will hereinafter be more fully described and claimed and illustrated in the accompanying drawings, in which—

Fig. 1. is a vertical section taken lengthwise through the center of an engine of my improved construction.

Fig. 2 is a diagrammatic view that graphically illustrates the positions of the various cranks of the crank shaft of my improved engine.

Fig. 3. is an enlarged vertical section taken approximately on the line 3—3 of Fig. 1.

Fig. 4. is a diagrammatic view graphically illustrating the relative arrangement of the transfer ducts that are utilized for conveying the pumped charge volumes from the pumps to the combustion chambers and also showing the arrangement of the piston valves that control the admission of charge volumes to the pumps and the admission of the pumped charge volumes to the combustion chambers.

Referring by numerals to the accompanying drawings, 10, 11, 12, 13, 14 and 15 designate six two diameter cylinders that are arranged in rows so that their axes are parallel and in the same plane. These cylinders may be cast en bloc or separately formed as desired and the chamber 16 of least diameter in each cylinder functions as a combustion chamber while the chamber 17 of greater diameter in each cylinder functions as a charge volume pumping chamber.

Arranged for operation within each cylinder is a two diameter piston such as 18, the portion of smaller diameter operating within the corresponding chamber 16 and functioning as a combustion piston, and the portion of larger diameter of each piston operating within the corresponding one of the pumping chambers 17 and functioning as a pumping piston.

Arranged immediately adjacent to each of the six cylinders is a pair of piston valve housings such as 19 and 20 and arranged for operation therein are piston valve housings and their pistons are arranged in a row that is parallel with the plane occupied by the axes of the six main cylinders of the engine and the axes of all of the piston valves are parallel with each other and with the axes of the main cylinders 10 to 15 inclusive. Each piston valve 21 controls the admission of charge volumes to the immediately adjacent main clyinder pump while each piston valve 22 controls the admission of the pumped charge volumes into the combustion chamber of the adjacent and corresponding main engine cylinder.

The head ends of all of the main cylinders and the piston valve housings 20 are closed by a head block 23 and formed in the underside thereof are transversely disposed recesses such as 24 that connect the head ends of the corresponding piston valve chambers in the housings or cylinders 20. These recesses 24 constitute common compression and combustion clearance chambers for the fuel charge volumes taken into the combustion chambers, and seated in head 13, preferably at points above the piston valves 22, are ignition devices such as spark plugs 25. Each valve 22 controls the admission of pumped fuel charges through inlet ports such as 26 that are formed in each piston valve housing 20 and each piston valve 21 controls the admission of charge volumes into the adjacent pumping chamber through ports such as 27. Each combustion chamber 16 is provided with an exhaust port such as 28 that is controlled by the piston 18 that operates in said combustion chamber and formed in the head portion of each piston valve housing 19 are outlet ports such as 29 for the gaseous fuel charges that are pumped from the chambers 17.

The main engine cylinders 10 to 15 inclusive and the piston valve cylinders are disposed above a crank case 30 and journaled in suitable bearings therein and extending lengthwise of the engine structure beneath the row of piston valve housings is an auxiliary crank shaft 31 having twelve throws or pins such as 32, one for each piston valve, and connecting said piston valves to the respective throws of this auxiliary crank shaft are ordinary connecting rods such as 33. Auxiliary crank shaft 31 operates at the same speed with the crank shaft to which all of the pistons in the main engine cylinders are connected so that the piston valves move with the main pistons 18 at the same time and in the same direction.

Journaled in suitably arranged bearings 34 in crank case 30 and directly below the row of main engine cylinders is a main crank shaft 35 having six throws or crank pins designated by the numerals 36 to 41 inclusive, and said six throws or crank pins being arranged respectively beneath the main cylinders 10 to 15 inclusive. Crank shaft 35 is positioned so that its axis is intersected by the axes of the main cylinders of the engine and said main crank shaft occupies a position parallel with the auxiliary crank shaft 31. The two diameter pistons 18 in the main cylinders of the engine are connected by conventional connecting rods such as 42 to the cranks 36 to 41 respectively. Cranks 36 to 41 occupy the same radial plane relative to the axis of the crank shaft and therefore the said throws or pins 36 and 41 have the same axis. Likewise cranks 37 and 40 are co-axial and the cranks 38 and 39 at the center of the engine are co-axial. Thus the angular arrangement of the crank throws or pins from the ends of the engine structure are the same with the result that the pistons in cylinders 10 and 15 function synchronously, the pistons in cylinders 11 and 14 function synchronously and the pistons in cylinders 12 and 13 function synchronously.

As a result of this arrangement the power impulses impressed on the crank shaft are equalized or divided at points equidistant from its center, with the result that vibration resulting from unequal torsional strains are eliminated.

Leading from the outlet ports 29 that lead from the pump chamber in cylinder 10 to the inlet ports 26 in the piston valve housing 20 that is associated with cylinder 11, is a pumped charge volume transfer duct 43 and a similar charge volume transfer duct 44 leads from the outlet ports 29 that lead from the pump chamber of cylinder 11 to the inlet ports 26 of the piston valve cylinder 20 that controls the admission of pumped charge volumes into the combustion chamber of cylinder 12. A third pumped charge volume transfer duct 45 leads from the outlet ports 29 that lead from the pump chamber of cylinder 12 to the inlet ports 26 of the piston valve cylinder 20 that is associated with main cylinder 10.

A pumped charge transfer duct 46 leads from the outlet ports 29 that lead from the pump chamber of main cylinder 15 to the inlet ports 26 that are formed in the piston valve cylinder 20 that is associated with main cylinder 14 and a similar transfer duct 47 leads from the outlet ports 29 that lead from the pump chamber of main cylinder 14 to the inlet ports 26 in piston valve cylinder 20 that is associated with main cylinder 13.

A pumped charge volume transfer duct 48 leads from the outlet ports 29 that lead from the pump chamber of main cylinder 13 to the inlet ports 26 that are formed in the piston valve cylinder 20 that is associated with main cylinder 15.

Thus the six transfer ducts necessary for the proper functioning of the engine are arranged in two sets, the same being duplicates in arrangement from the two center main cylinders 12 and 13 outwardly toward the end cylinders 10 and 15 (see Fig. 4).

Inasmuch as each charge volume inlet control valve 21 moves in the same direction and at the same time with its corresponding pumping piston, said piston valve will cooperate with the pumping piston to force the charge volumes drawn into the pump and valve chambers outwardly through the corresponding outlet port 29 and the transfer duct leading therefrom.

In the operation of my improved engine charge volumes are simultaneously admitted to the head ends of the combustion chambers of two of the main cylinders and the common clearance chambers 24 that are associated therewith by reason of the fact that the crank throws of crank shaft 35 are arranged in pairs with the members of each pair arranged equidistant from the center of the crank shaft. Thus charge volumes will be admitted simultaneously to the head ends of the combustion chambers in cylinders 10 and 15 by reason of the fact that the cranks 36 and 41 to which the pistons in said cylinders are connected are co-axial. In like manner charge volumes will be simultaneously admitted to the head ends of the combustion chambers in cylinders 11 and 14 by reason of the fact that crank pins 37 and 40 to which the pistons in said cylinders are connected are co-axial. Likewise charge volumes will be simultaneously admitted to the head ends of the combustion chambers in cylinders 12 and 13 inasmuch as crank pins 38 and 39 to which the pistons in said cylinders are connected are co-axial.

The charge volumes admitted to the head ends of a pair of the combustion chambers through the inlet ports 26 when the corresponding pistons 22 are at their low center will under the pressure of the corresponding pumps pass through the corresponding common clearance chambers 24, thence downwardly through the combustion chambers, thereby driving the greater portion of the products of combustion from the previously ignited fuel charges out through the corresponding exhaust ports 28.

On the succeeding upward strokes of the corresponding pistons 18 and piston valves 22 the admitted charge volumes will be compressed in the corresponding common clearance chamber 24 and at the point of highest compression the two compressed charges will be simultaneously ignited by sparks produced between the corresponding spark plugs 25. The rise in pressure following combustion of the compressed charges will be impressed on the heads of the corresponding pistons to drive the same downward on their power stroke and thus two power impulses will be transmitted to the crank shaft at two points spaced at equal distances from the center thereof.

On the downward strokes of the pistons in the main cylinders and the charge volume inlet control valves 21, the latter will uncover the inlet ports 27 thereby admitting through said ports charge volumes that are drawn into the corresponding pump chambers and on the succeeding upward stroke of the main pistons and inlet control valves the charge volumes will be forced from the pump chambers out through ports 29 and through the corresponding transfer ducts to the combustion chambers of two of the main cylinders. Obviously as there are six main cylinders and the same are arranged in pairs, the crank shaft will receive three power impulses during each complete rotation and, due to the arrangement of the crank throws of said crank shaft, these power impulses will be divided equally on the portions of said crank shaft to the sides of the longitudinal center thereof.

In the conventional six cylinder, four stroke cycle internal combustion engine the row of six cylinders produce as a result of the four stroke cycle operation, a constant torque through that half of the crank shaft from which the power is taken off, hence there cannot be any reaction of this portion of the shaft. The front end half of the shaft does not have this constant torque transmitted through it as a consequence of the periods between power impulses owing to the firing order that must be maintained in the cylinders when there are six of the latter and they are functioning on the four stroke cycle principle. In my improved engine a power impulse is impressed on each end of the shaft at an equal distance from the rocking axis endwise, which power impulses take place simultaneously and as a result the entire length of the shaft is maintained under the same torque conditions and consequently torsional vibration is eliminated.

It will be understood that minor changes in the size, form and construction of the various parts of my improved engine may be made and substituted for those herein shown and described without departing from the spirit of my invention, the scope of which is set forth in the appended claims.

I claim as my invention:

1. In a two stroke cycle internal combustion engine, a series of six cylinders arranged in a row, each cylinder having a two diameter bore to provide a combustion chamber and a pump chamber, a two diameter piston arranged for operation within the two diameter bore of each cylinder, the head end of the combustion chamber being provided with a charge volume inlet port, the wall of the combustion chamber being provided with an exhaust port that is open when the piston is at the crankward end of its stroke, the head end of the pumping chamber in the two diameter cylinder having a port, a pair of piston valve cylinders arranged adjacent to each two diameter cylinder, the axes of each set of three cylinders being parallel, the two valve cylinders occupying different planes and the chambers therein communicating respectively with the ports at the head ends of the combustion and pumping chambers of the respective two diameter bore cylinder, piston valves arranged for operation within the valve cylinders for controlling the ports therein, a crank shaft to which all of the piston valves are connected, and a crank shaft to which the two diameter pistons in the two diameter bore cylinders are connected.

2. In a two stroke cycle internal combustion engine, a series of six cylinders arranged in a row, each cylinder having a two diameter bore to provide a combustion chamber and a pump chamber, a two diameter piston arranged for operation within the two diameter bore of each cylinder, a pair of piston valve cylinders arranged adjacent to each of the six two diameter cylinders, the members of each pair of valve cylinders being arranged in different vertical planes, the upper portion of the upper one of each pair of valve cylinders having communication with the head end of the combustion chamber of the corresponding two diameter cylinder, the head end of the lower one of each pair of valve cylinders having communication with the head end of the pump chamber in the corresponding two diameter cylinder, each combustion cylinder having an exhaust port located so that it is open only when the piston in said combustion chamber is at the crankward end of its stroke, piston valves arranged for operation within all of the valve cylinders, a crank to which all of the piston valves are connected, and a crank to which all of the two diameter pistons are connected.

In testimony whereof I affix my signature.

EVERETT R. BURTNETT.